United States Patent [15] 3,654,499

Smith [45] Apr. 4, 1972

[54] CHARGE COUPLED MEMORY WITH STORAGE SITES

[72] Inventor: George Elwood Smith, Murray Hill, N.J.

[73] Assignee: Bell Telephone Laboratories, Incorporated, Berkeley Heights, N.J.

[22] Filed: June 24, 1970

[21] Appl. No.: 49,462

[52] U.S. Cl................................307/304, 307/238, 307/279, 317/235 R, 328/37, 340/173 R, 340/173 CA

[51] Int. Cl....................G11c 19/00, G11c 7/00, H03k 25/02

[58] Field of Search..................307/213, 279, 238, 298, 303, 307/280, 304; 317/235, 235 R; 340/173 FF, 173 CA, 173 RC; 328/37

[56] References Cited

UNITED STATES PATENTS

| | | | |
|---|---|---|---|
| 2,922,898 | 1/1960 | Henisch | 307/303 X |
| 2,900,531 | 8/1959 | Wallmark | 307/304 X |
| 3,500,142 | 3/1970 | Kahng | 340/173 X |
| 3,191,061 | 6/1965 | Weimer | 317/235 B |

OTHER PUBLICATIONS

Altman, New MOS Technique Points Way To Junctionless Devices, Electronics, May 11, 1970, pp. 112–118

*Primary Examiner*—Bernard Konick
*Assistant Examiner*—Stuart Hecker
*Attorney*—R. J. Guenther and Arthur J. Torsiglieri

[57] ABSTRACT

The specification describes a variety of charge coupled memory devices most of which are "read-only" memories in which the charge capacity of selected sites is permanently or semipermanently fixed. If charge is accumulated in these sites to the equilibrium amount and then shifted to an output site, the signal will reflect the programmed capacity of the sites.

30 Claims, 8 Drawing Figures

INVENTOR
G. E. SMITH
BY
ATTORNEY

WITHOUT CHARGE

WITH CHARGE

CHARGE COUPLED MEMORY WITH STORAGE SITES

This invention relates to charge coupled memory devices.

The recent discovery of the charge coupled functional device concept that is described and claimed in copending U.S. Pat. application Ser. No. 11,541, filed Feb. 16, 1970, by W. S. Boyle and G. E. Smith, allows for the fabrication of a new form of memory device in which the capacity of each charge storage site is selectively fixed usually by adjusting the electrical capacity at each site of the MIS structure in accordance with input information. With the storage capacity of each site independently fixed, charge can be repeatedly accumulated in the same fixed pattern and as the charge is shifted out, the signal level will correspond to the input information.

The charge coupled storage concept is fully explained in the application referred to above. That device in its basic form is a dynamic memory store although with the incorporation of recirculation and regeneration, as taught therein, the storage duration can be extended to provide an essentially permanent memory feature.

According to the present invention a memory function is built into each storage site so that recirculation and regeneration is not necessary.

The memory devices of the invention are conveniently categorized into one of two forms. In one, the storage capacity of each site is permanently fixed, generally by the structural characteristics of the device, to give a "read-only" memory.

In the second category are permanent memories in which the storage capacity of the sites can be conveniently adjusted or reprogrammed. This adjustable feature suggests that these devices can, if desired, be operated in a nonpermanent mode. All of these devices share the common feature that the electrical capacitance of the MIS storage elements is selectively altered. In the usual case it will be preferable to employ parallel readout for these devices although with suitable adjustment of the accumulation and shift potentials, serial readout can be used.

Structures in which the capacitance is permanently fixed include those in which the physical thickness of the insulating layer is varied according to the information program. Alternatively, at least two (two for digital devices) different insulators are used, different in the sense that they exhibit significantly different dielectric properties. Included under this device concept are homogeneous insulators in which the dielectric strength is locally altered as by selective diffusion or implantation of more, or less, conductive ions.

The electrical capacitance of the individual MIS elements can also be fixed by selecting the properties of the metal. Using metal conductors having different work functions results in storage elements with different capacitances.

Preferred from the standpoint of versatility are those embodiments wherein the storage capacity of the individual sites can be conveniently adjusted with new information. In one such embodiment, floating or dielectrically isolated capacitors are provided at each memory site. Information is shifted into the charge coupled register by normal charge coupled action and is transferred to the isolated capacitors by a prescribed read-in process. The charge remains in the isolated capacitor as long as desired depending upon the effectiveness of the dielectric isolation. The amount of this charge, in an analogue sense, or the presence or absense of charge, in a digital sense, determines the charge capacity of the storage elements. The information in the memory elements can be erased conveniently for reprogramming.

These and other aspects of the invention may be more evident from the following detailed description. In the drawing.

Figure 1:
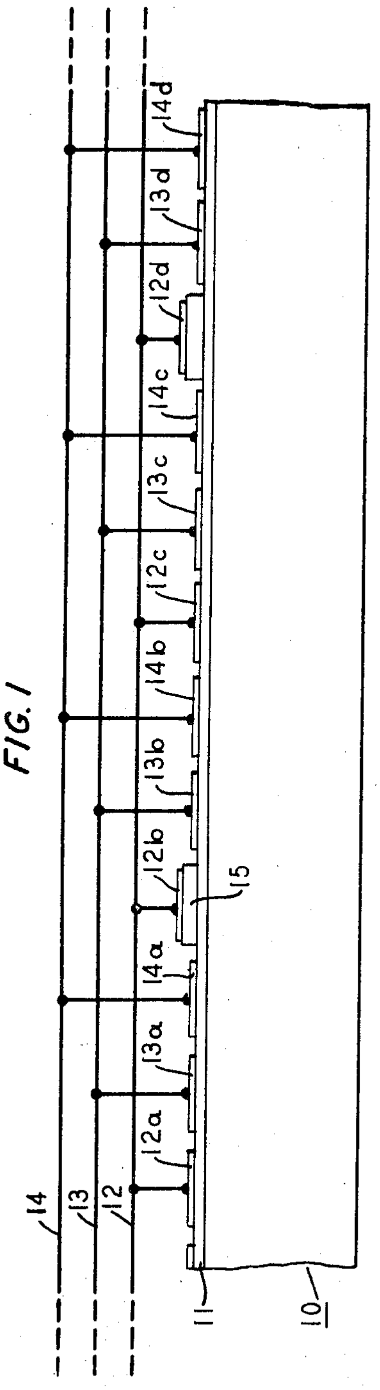
FIG. 1 is a front section of a portion of a charge coupled memory device according to one embodiment of this invention.

In the device represented by FIG. 1, a series of conventional charge coupled elements are shown in combination with memory storage elements according to the invention. With a three wire drive scheme, as in this device, every third electrode is used for accumulation. The structure includes semiconductor 10, insulating layer 11, the metal drive electrodes **12*a*–12*d*, 13*a*–13*d* and 14*a*–14*d* and their associated conductors 12, 13 and 14. Of the drive electrodes, 12*a*–12*d* comprise accumulation stages and provide the memory function. As shown in the figure certain of these, i.e., 12*b* and 12*d*, have thick insulating layers 15 additionally provided. Thus the capacitance of these elements is less than that of the elements comprising electrodes 12*a* and 12*c*. With a bias on conductor 12, carriers are allowed to accumulate under conductors 12*a*–12 to their equilibrium value. The accumulation process can be facilitated by several methods. Illuminating the semiconductor 10 produces an excess of free carriers by photon absorption. Alternatively, carriers can be shifted in by charge coupled action and allowed to equilibrate to the capacity of each element. A similar result is conveniently obtained by driving all elements to avalanche so that carriers are injected at each site. Accumulation also occurs inherently due to thermal processes. This last mechanism is attractive in its simplicity and is adequate except where very short accumulation periods are required. The accumulated carriers are then shifted out by normal charge coupled action by sequentially biasing conductors 12, 13 and 14. The signal produced by carriers accumulated under electrodes 12*a* and 12*c* will be larger than the corresponding signal from elements associated with electrodes 12*b* and 12*d***.

Using this series readout mode the variation in capacitance of the accumulation elements may in some cases interfere wit the shift operation. However, this can be minimized if the drive or shift potentials are large (i.e., at least twice) the potential used for accumulation.

A preferred way of avoiding the problem just alluded to is to use parallel readout. An embodiment illustrating this expedient is shown in plan view in FIG. 2A. In this device the charge coupled array of elements **12*a*–12*d*, 13*a*–13*d*, and 14*a*–14 are similar to those of FIG. 1 except that elements 12*a*–12 are simply conventional drive elements. The three wire drive conductors 12, 13 and 14 are biased in sequence to affect the shift mechanism. The accumulation or memory stage is parallel to the shift row and comprises a single conductor strip 17 with a bias connection 16. Memory elements are shown at 12*a*' and 12*c*'. These elements are simply thin portions in a relatively thick insulator 11'. The structure is evident from FIG. 2B which is a section through element 12*c*'. The high capacitance associated with these elements will allow accumulation of carriers for, for example, a digital "one," as compared with the absence of carriers accumulated adjacent electrodes 12*b* and 12*d*, which might represent digital "zeros." When the accumulation is complete, conductor 12** is biased and the sequential shift operation produces the digital signal at the output. For this segment of the device, that signal would be 0101.

Charge transfer between the accumulation or memory stage and the charge coupled line is to be avoided during the shift operation. Several simple techniques can be used to achieve this. For example, the accumulation process can be made long in comparison to the readout time so that interaction during readout will involve too few carriers to impair the signal. Alternatively, the bias on electrode 17 is removed during the shift operation so that no carriers will accumulate.

The accumulation elements 12a'–12d' can be physically isolated from the charge coupled line with a gate electrode. This will be evident from the discussion below in connection with FIG. 3.

Figure 2A:
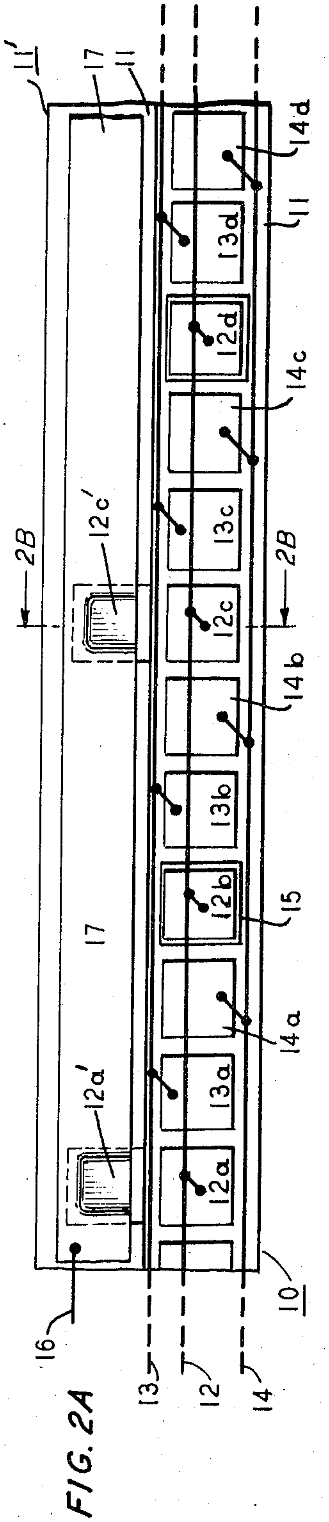
FIGS. 2A and 2B are sectional views of an alternative charge coupled memory device employing parallel coupling for readout.
Figure 2B:
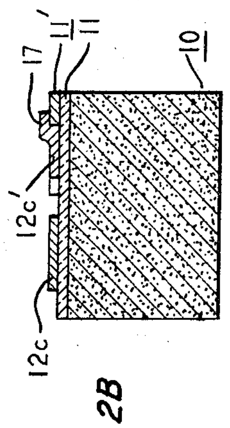

There are various convenient ways of fabricating the structure of FIGS. 1 and 2A taking advantage of known semiconductor processing techniques. For example, the insulator can be deposited to the thickness desired at elements 12b and 12d (i.e., the combined thickness of layers 11 and 15 in FIG. 1 or the thickness of layer 11' in FIG. 2A) and then selectively etched to form the thinned regions. Alternatively a composite layer such as $SiO_2$ and $Si_3N_4$ can be deposited which is then selectively etched with a preferential etchant to give the desired structure. These techniques are well known and form no part of the invention.

Another means for obtaining a difference in storage capacity between selected elements is to use metal electrodes having significantly different work functions. The structure in this case would be essentially that shown in FIG. 1 except that the insulating layer would be uniform in thickness at each element associated with electrodes 12a, 12b, 12c and 12d. Electrodes 12a and 12c would be, e.g., platinum, with electrodes 12b and 12d tungsten. The difference in work function between these metals is approximately 1.0 volts, giving an easily detectable variation in charge storage with normal bias voltages.

The parallel readout arrangement of FIG. 2A can be easily adapted to this embodiment. This would require simply that electrode 17 be segmented so that region 12a' is covered with platinum and region 12c' with tungsten. A common conductor 16 is still appropriate as these sites are normally biased simultaneously.

Figure 3:
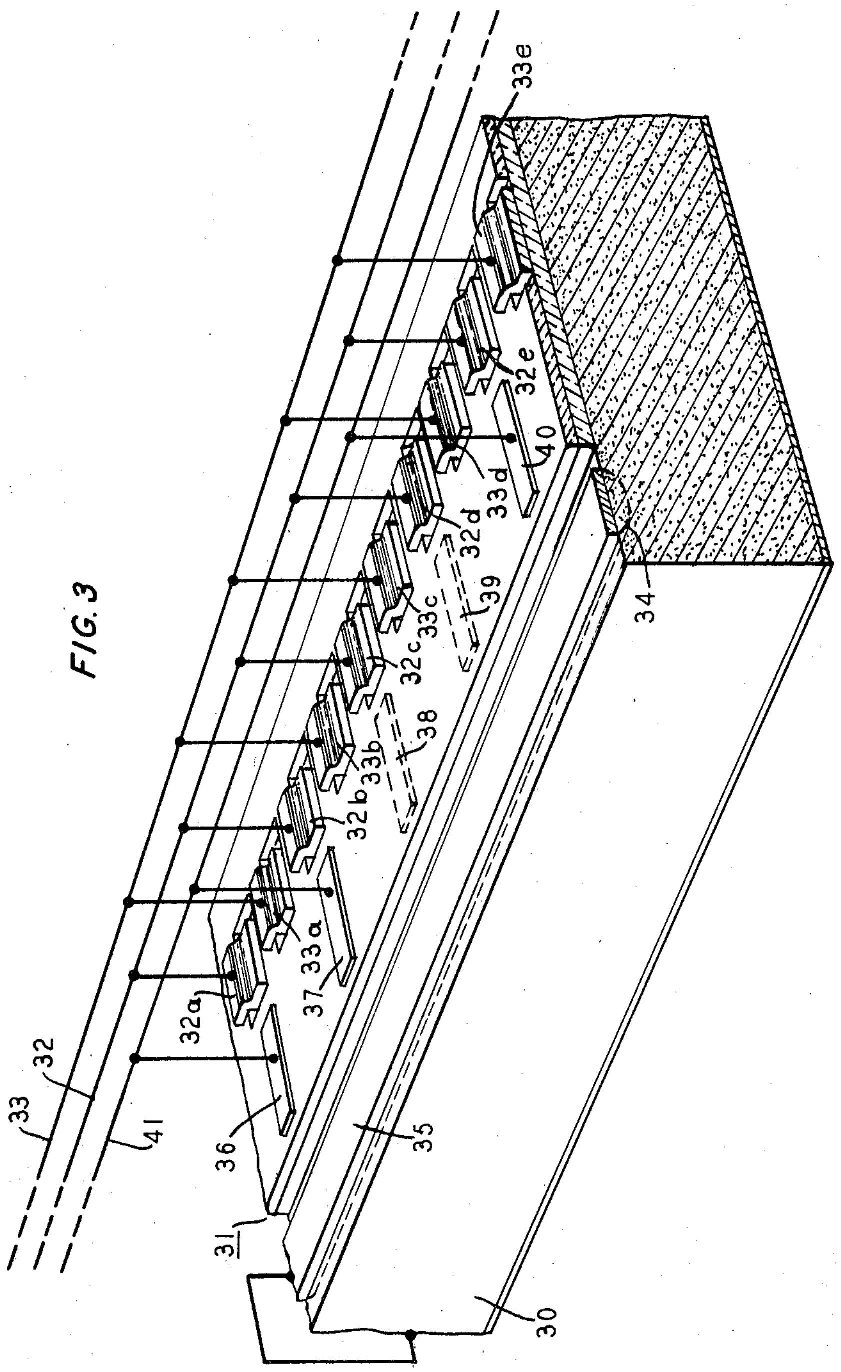
FIG. 3 is a perspective view of a further embodiment of the invention.

A modification of the parallel-coupled read-only memory of FIG. 2A is shown in FIG. 3. For illustration, this device employs the two wire scheme described and claimed in application Ser. No. 11,448, filed Feb. 16, 1970 by D. Kahng and E. H. Nicollian. In this case every other element comprises a memory stage. The device includes the familiar semiconductor storage medium 30, insulating layer 31, and the sequence of drive electrodes 32a, 33a, 32b, 33b, 32c, 33c, 32d, 33d, 32e and 33e, all connected to conductors 32 and 33 as shown. The sequential drive operation is described completely in the application alluded to above and the function of the stepped insulator and the drive electrode configuration will not be repeated here. The front portion of the semiconductor 30 is not covered with insulator and contains a continuous longitudinally extending diffused region 34 which forms with the substrate a p-n junction. An electrode 35 is provided to externally short the junction. This p-n junction functions similarly to the source of an IGFET and provides a continuous supply of charge carriers in close proximity to the electrode sequence 32a to 33e, but as yet uncoupled to it. The coupling is made selectively by gate electrodes 36, 37, and 40. Gates at 38 and 39 are intentionally omitted as called for by the memory code. When the gate electrodes are biased via conductor 41, charge flows from the source junction 34 to the region under the gates. Conductor 32 is biased coincidentally with conductor 41 and charge flows through the biased gates into the charge coupled line. The charge accumulated under the associated drive electrodes 32a, 32b, 32c, 32d and 32e is shifted out in the normal way by sequentially biasing conductors 32 and 33. The binary signal derived from this sequence would be 10011.

These memory stages resemble hybrid IGFETS with a p-n junction source and an MIS drain. Dimensions and other specifications for the device are straightforward extensions of prior art teachings.

At this point it is evident that the device of FIG. 3 can alternatively be made with individual p-n junctions made at selected sites and with a continuous gate electrode. This embodiment is such an obvious alternative that it need not be depicted.

It is also worth noting that these devices are digital and in the form shown do not have analog capability. They are also characteristically distinct from the other devices described herein in that those devices involve programming the inherent storage capacity of selected storage sites while these embodiments function by charging only selected elements of a charge coupled line (all elements having essentially the same charge capacity) and wherein the charging is accomplished by coupling to an instantaneous supply of carriers. Note that in the device of FIG. 2A the charging of the charge coupled line is selective but the supply of carriers requires a finite accumulation period. Consequently it is evident that devices of the type suggested by FIG. 3 are inherently faster and appear at this point to be preferred charge coupled memory devices.

Figure 4:
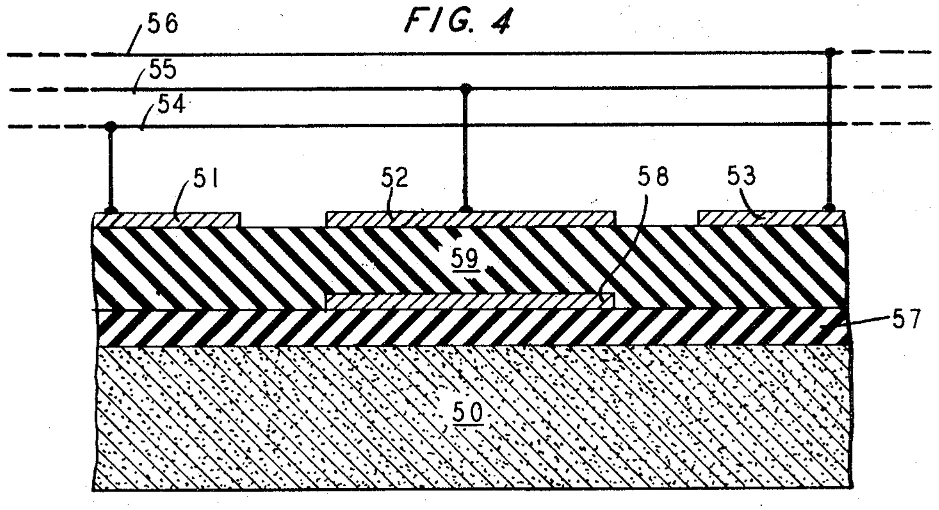
FIG. 4 is a front sectional view of a charge coupled memory device in which the memory is semipermanently fixed.

An embodiment of a charge coupled memory device in which the memory can be adjusted is shown in FIG. 4. The substrate 50 is a semiconductor such as silicon, and the three electrodes 51, 52 and 53 comprise the three wire drive system with associated conductors 54, 55 and 56. This drive scheme is exemplary only, and for a more complete description of the operation of this and alternative systems, reference is made to the aforementioned copending applications. The intermediate layer, which is normally a homogeneous insulator of an MIS structure, in this case contains the memory element. A thin insulating layer 57 covers the substrate 50 and separates it from the floating capacitor plate 58. The capacitor plate may be metal or semiconductor and serves simply to store charge. A second insulating layer 59 isolates the capacitor from the drive electrodes 51, 52 and 53. The insulating layer 57 is partially conducting so as to allow charge to be transferred between the capacitor plate 58 and the substrate 50. The insulating layer 59 should be sufficiently thick to prevent significant amounts of charge from leaking from the drive electrodes 51, 52 and 53 under normal bias conditions.

Figure 5:
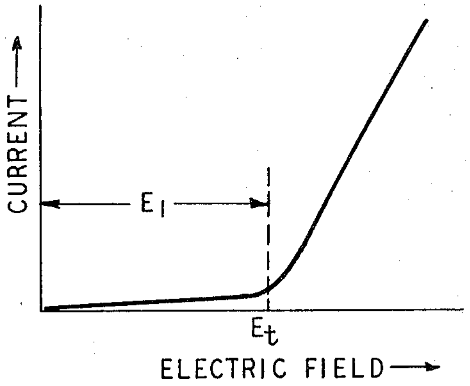
FIG. 5 is a current voltage plot describing a property of the insulating barrier between the storage medium and the memory controlling element in the device of FIG. 4.

The partially conducting insulator 57 should exhibit the non-ohmic behavior described by FIG. 5. Charge stored at the semiconductor-insulator interface should not leak to the capacitive memory plate except during the read operation. If the insulator is non-ohmic, a threshold field, $E_t$, allows fields above this value to be used for reading into and erasing the memory, while the use of a field below $E_1$ permits normal storage and drive functions without affecting the memory.

Figure 6A:
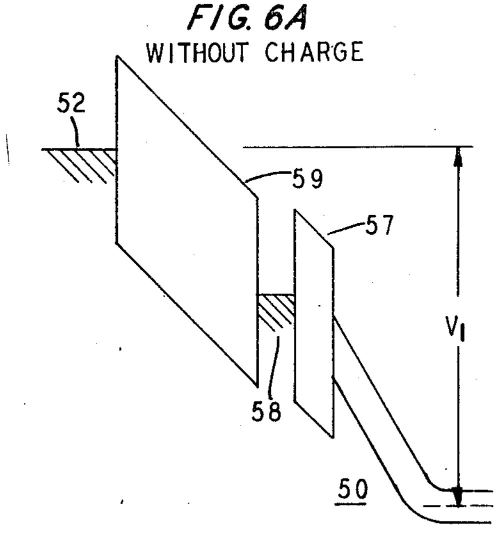
FIGS. 6A and 6B are plots of the band structure of the memory element of FIG. 5 with and without fixed charge in the memory controlling element.
Figure 6B:
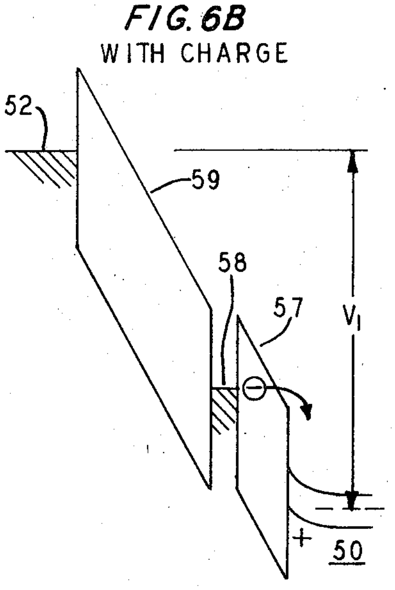

The read-in operation through which the floating capacitor plate 58 is charged is described by FIGS. 6A and 6B. FIG. 6A is a band structure diagram of the device of FIG. 4 without charge present at the semiconductor-insulator interface (n-semiconductor), while FIG. 6B is a corresponding band structure diagram with charge stored at the interface. The presence or absence of charge (or the amount of charge) is the information being read into the memory and can be placed locally under the memory plate by normal charge coupled action. With the charge pattern in place a relatively large voltage $V_1$ is imposed across the composite structure. The magnitude of $V_1$ is such that with no charge at the interface (FIG. 6A) the electric field at the barrier between the floating capacitor 58 and the semiconductor 50 is low enough to prevent conduction, i.e., below the threshold field $E_t$. However, with positive charge at the interface, there is a larger voltage drop across the insulator as compared to the semiconductor, resulting in a field across the thin insulator greater than $E_t$. This larger field allows conduction of electrons through the thin insulator 57 and leaves a net positive charge in the floating capacitor. This charge is effectively isolated and will decay with a time characteristic of the leakage current for fields below $E_t$. The operating voltages are chosen smaller in magnitude than $V_1$ so that the leakage current is kept acceptably small. With proper choice of the insulator 57 and the drive voltage, the charge decay time can be made essentially infinite. A positive voltage equal to or exceeding $V_1$ on electrode 52 will extract majority carriers from the semiconductor and erase the charge.

The amount of charge read into the capacitor 58 will determine the storage capacity for holes of the semiconductor-insulator interface. Thus the memory can be made analog as well as digital.

The read operation requires simply the accumulation of carriers in each of the memory stages (in this case those associated with conductor 55) to the extent of its capacity. With an nttype semiconductor a negative voltage is impressed on the conductor 55 associated with the memory element comprising electrode 52, and holes are allowed to accumulate to their thermal equilibrium value. The charge is then shifted out by charge coupled action. The accumulation of carriers can be accelerated by photo-induced holes or by shifting in charge by charge coupled action at a large negative voltage and then making the voltage less negative so that each site becomes saturated.

The accumulation of carriers can be selectively controlled by focusing a light image on the substrate and comparing the spatial intensity of the image with the memory. In this way the device can be made to function as an image comparator or for pattern recognition.

The capacitive memory plates are similar in function and structure to the floating gate field effect transistor described in Bell System Technical Journal, July–Aug. 1967, pp. 1,288–1300.

The following is a specific example of this embodiment of the invention and prescribes appropriate specifications from which all the devices described herein can be conveniently derived.

The device of FIG. 4 is made with 10Ωcm. silicon as the substrate material 50. The thin insulating layer 57 is $SiO_2$ grown or deposited to a thickness of 10 to 1,000 A. The capacitor memory plates 58 are platinum or silicon with a thickness of 100 to 1,000 A. The plate thickness is not functionally important and the range given is simply convenient. A thick plate 58 risks dielectric discontinuities in the insulator 59. The voltage required for conduction between plate 58 and substrate 50 is of the order of 50 millivolts per angstrom of insulator. Therefore the voltage range corresponding approximately to the threshold field $E_t$ of FIG. 5 would range from 0.5 volts to 50 volts for the recommended range of insulator thickness. The insulator 59 can also be $SiO_2$ with a thickness of the order of 200 to 10,000 A. and, for reasons evident from the foregoing description, at least twice the thickness of the insulating layer 57. If the insulating layers are composed of different materials, e.g., a combination of $SiO_2$ and $Si_3N_4$, then the thickness and dielectric strengths of the materials should be chosen so that the insulator 57 has at least twice the conduction of the layer 59 for a given write voltage. The drive electrodes 51, 52, and 53 can be of any conducting material such as gold, platinum or polycrystalline silicon. The memory plates 58 can also be formed of semiconductor material such as silicon. Advantageously the memory plates and the storage medium 10 are of different conductivity type.

The memory device of the invention has been described with a conventional semiconductor substrate and the depletion mode of operation according to the teachings of application Ser. No. 11,541 filed Feb. 16, 1970 by W. S. Boyle and G. E. Smith. The memory mechanism will function in an equivalent manner with the enhancement type charge coupled device using insulating semiconductors as described and claimed in an application filed by D. Kahng (D. Kahng Case ·23), Ser. No. 47,205 on June 19, 1970. For the purposes of this invention the term insulating semiconductor means those materials defined in that application.

Alternative structures can be used for the floating plate capacitor shown in FIG. 4. For example if two different insulating materials are deposited in a dual layer, charge is typically trapped at the interface. This charge resides in deep traps and these traps can be depleted and replenished via the mechanism described above. The interfacial traps can be thought of as directly analogous to the memory plates 58 of FIG. 4. A useful combination of insulators for this embodiment are $SiO_2$–$Si_3N_4$ and $SiO_2$–$Al_2O_3$. The latter combination is convenient from the point of view of fabrication. A dual layer of silicon and aluminum can be deposited and then anodized, e.g., by plasma anodization. The technique provides good control over the interface properties. A similar result would be expected for $Si_3N_4$ and AlN. An explanation of these interfacial states and the mechanism for filling and emptying them is described in RCA Review, Vol. 30, June 1969, pp. 335–382.

Another related charge storage mechanism relies on deep traps in the bulk of the insulator. Taking advantage of these, a very simple memory device can be constructed. It requires simply a homogenous insulating layer between the drive electrodes and the storage mechanism. Thus it is structurally indistinct from the basic charge coupled device except for the voltages used. The basic charge coupled device can use drive voltages of different values but all these would be below the threshold for conduction across the insulator. In the normal operating mode, carrier injection to or from the storage medium is undesirable. Thus the provision of a bias means for impressing a voltage large enough to fill or empty traps in the insulator with an operating sequence appropriate to the memory mode differentiates this device from the conventional charge coupled device.

Yet another embodiment in which the storage site capacitance can be semipermanently adjusted uses a structure with a stepped insulator similar to those of FIGS. 1 and 2A except that the thickness of the insulator can be adjusted by using, as the insulating material, a thermoplastic material of the type described in the Journal of Applied Physics, Dec. 1959, pp. 1,870–1,873, and RCA Review, Vol. XXIII, Sept. 1962, p. 413. These materials are typically polymers with a low-temperature glass transition. When they are heated to their plastic transformation point in the presence of an electric field they constrict in the direction of the field until the electrostatic forces balance the surface tension forces. Lowering the temperature will freeze the material in the deformed state, and raising the temperature again in the absence of a field will allow the surface tension forces to restore the material to its original state. Thermoplastics are not very compressible so that constriction will displace the plastic from the area under the electrode.

The device just described functions basically in the same manner as those described in connection with FIG. 1 except for the memory read-in. To accomplish the latter, charge representing the desired memory code is shifted into electrodes 12*a*, 12*b*, 12*c* and 12*d*. Following the previous example this will leave charge at sites accompanying electrodes 12*a* and 12*c* with no charge below electrodes 12*b* and 12*d*. The thermoplastic layer is then heated causing constriction of the plastic at sites 12*a* and 12*c* and no constriction at sites 12*b* and 12*d*. Cooling the thermoplastic leaves the desired stepped insulator. Extension of this scheme to analogue memory devices is straightforward.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A charge coupled memory device comprising:
a charge storage medium,
an insulating layer covering the charge storage medium,
a plurality of several discrete charge storage sites within the charge storage medium each formed by an associated electrode field plate disposed on the insulating layer, said electrode field plates being spaced along the insulating layer with each contiguous to at least two other field plates such that with appropriate electrical bias applied to at least two of said electrode field plates electrical charge can be made to pass controllably between selected charge storage sites and ultimately to a detection site, and
detector means for detecting charge at the detection site,
the invention characterized in that the insulating layer has at least $10^{16}$ deep charge carrier traps per $cm.^3$ and bias means for applying a first voltage to the electrode field plates for transferring charge between charge storage sites and an encoding means for applying between certain of the electrode field plates and the storage medium a second voltage of a sufficient magnitude to cause conduction of carriers between the storage medium and the deep traps.

2. A charge coupled memory device comprising:
a charge storage medium,
a first insulating layer covering the charge storage medium,
a plurality of several discrete charge storage sites within the charge storage medium, each formed by an associated electrode field plate disposed on said first insulating layer, said electrode field plates being spaced along the insulating layer with each contiguous to at least two other field plates such that with appropriate electrical bias applied to at least two of said electrode field plates electrical charge can be made to pass controllably between selected storage sites and ultimately to a detection site, and
detector means for detecting the charge at the detection site,
the invention characterized in that at least some of the charge storage sites additionally include a second insulating layer overlying the first insulating layer, thereby forming deep charge carrier traps at the interface between the first and second insulating layers, and electrode means for interconnecting the second insulating layer with the charge storage medium for causing charge to flow between the storage medium and the deep traps.

3. The charge coupled memory device of claim 2 further including bias means for applying a first voltage to the electrode field plates for transferring charge between charge coupled elements, and a second voltage across the second insulating layer for causing charge to flow between the storage medium and the deep traps.

4. A charge coupled memory device comprising an array of semiconductor, insulated-gate, field effect devices each having an MIS drain region and selected ones having a source region, a gate common to at least several devices, the drain regions of these several devices disposed side-by-side to form a charge coupled line, means for simultaneously biasing the common gate and the drain regions and means for sequentially biasing the drain regions of the charge coupled line to shift charge along the line.

5. The memory device of claim 4 in which the selected source regions are p-n junctions.

6. The memory device of claim 4 in which the semiconductor and insulator of the MIS drain regions are silicon and $SiO_2$ respectively.

7. A charge coupled memory device comprising an array of semiconductor, insulated-gate, field effect devices each having an MIS drain region and selected ones having a common gate, a source region common to at least several devices, the drain regions of these several devices disposed side-by-side to form a charge coupled line, means for simultaneously biasing the common gate and the drain regions and means for sequentially biasing the drain regions of the charge coupled line to shift charge along the line.

8. The memory device of claim 7 in which the common source region comprises a p-n junction.

9. The memory device of claim 7 in which the semiconductor and insulator of the MIS drain regions are silicon and $SiO_2$ respectively.

10. A charge coupled memory device comprising:
a charge storage medium,
a first insulating layer overlying the charge storage medium,
a plurality of discrete memory plates positioned on the first insulating layer, said memory plates composed of a material capable of storing electrical charge,
a second insulating layer covering at least the memory plates, the second layer having a thickness of at least twice the thickness of the first insulating layer,
a plurality of several discrete drive electrodes positioned sequentially on said second insulating layer over the memory plates so as to form a plurality of several semiconductor-insulator-conductor-insulator-conductor charge storage memory elements,
at least one charge coupled transfer element associated with each charge storage memory element so as to allow for transfer of charge sequentially between said charge storage memory elements and charge coupled transfer elements,
means for reading the storage capacity of the charge storage memory elements comprising means for accumulating charge in each memory storage element in proportion to its storage capacity and
a detection site located adjacent to one of said elements for detecting charge transferred from that element.

11. The charge coupled memory device of claim 10 further including:
electrical means for interconnecting selected drive electrodes and the charge storage medium so that charge stored in the charge storage medium can be transferred to the memory plates, thereby selectively adjusting the storage capacity of the charge storage memory elements.

12. The device of claim 10 in which the means for transferring the charge comprises a three wire sequential drive system and each storage location comprises two conventional charge transfer coupled elements (without memory) and one charge storage memory element.

13. The device of claim 10 in which the means for accumulating charge in the charge storage memory elements is a means for effecting a time delay in the operation of the device so as to allow thermally generated charge to accumulate in each memory storage element to its equilibrium value.

14. The device of claim 10 which the means for accumulating charge in the charge storage memory elements includes a means for biasing the memory storage elements at a voltage sufficient to cause avalanching.

15. The device of claim 10 in which the means for accumulating charge in the charge storage memory elements comprises a lift source incident on the semiconductor substrate for creating free charge carriers.

16. The device of claim 10 in which the means for accumulating charge in the charge storage memory elements comprises means for biasing the memory elements at a first voltage for accumulating free charge at a rapid rate and means for reducing the bias to a second lower voltage for transferring the resulting accumulated charge.

17. A charge coupled memory device comprising:
a charge storage medium,
a first insulating layer covering the charge storage medium,
a plurality of several discrete charge storage sites within the charge storage medium each formed by an associated electrode field plate disposed on said first insulating layer, said electrode field plates being spaced along the insulating layer with each contiguous to at least two other field plates such that with appropriate electrical bias applied sequentially to at least two of said electrical field plates electrical charge can be made to pass controllably between selected storage sites and ultimately to a detection site, and
detector means for detecting the charge at the detection site,
the invention characterized in that certain of the charge storage sites additionally include charge storage memory plates interposed between the first insulating layer and the charge storage medium, said memory plates being insulated from the charge storage medium by a second insulating layer having a transverse conduction of no more than half that of the first insulating layer.

18. The device of claim 17 further including means for applying a first voltage between selected drive electrodes and the said body, the voltage having a value sufficient to cause conduction of charge through said first insulating layer between the body and the memory plate but not through the second insulating layer, and means for applying a drive voltage to said drive electrodes in sequence to transfer charge storage elements, said drive voltage being substantially lower than the first voltage and insufficient to cause significant conduction of charge through the first insulating layer.

19. The device of claim 18 in which said body is silicon.

20. The device of claim 19 in which the first and second layers are $SiO_2$.

21. The device of claim 20 in which the memory plates are metal.

22. The device of claim 20 in which the memory plates are semiconductor.

23. A charge coupled memory device comprising:

a charge storage medium, an insulating layer covering the charge storage medium, a plurality of several discrete charge storage sites within the charge storage medium each formed by an associated electrode field plate disposed on the insulating layer, said electrode field plates being spaced along the insulating layer with each contiguous to at lest two other field plates such that with appropriate electrical bias applied to at least two of said electrode field plates electrical charge can be made to pass controllably between selected charge storage sites and ultimately to a detection site, and detector means for detecting charge at the detection site the invention characterized in that the storage capacities of selected storage sites are adjusted to one of at least two predetermined values so that when the charge carriers accumulate in these storage sites to the storage capacity and are then transferred to the detection site a predetermined signal output is obtained.

24. The device of claim 23 in which the storage capacity of selected sites is impermanently fixed by storage of a predetermined amount of fixed charge at these sites.

25. The device of claim 24 further including means for adjusting the amount of fixed charge stored.

26. The device of claim 23 in which the storage capacity of selected sites is fixed with a predetermined electrical capacitance.

27. The device of claim 26 in which the storage sites comprises MIS devices.

28. The device of claim 27 in which the electrical capacitance of selective sites is permanently fixed by providing insulating layers of varying thickness.

29. The device of claim 27 in which the electrical capacitance of selected sites is permanently fixed by proving metal layers with different work functions.

30. The device of claim 27 in which the insulating layer comprises an electrostrictive material and the electrical capacitance of selected sites is temporarily fixed by adjusting the thickness of the electrostrictive material at those sites.

* * * * *